April 29, 1969   H. F. LEADBETTER   3,440,756
ANGLING LURES
Filed Oct. 10, 1967

INVENTOR
HORACE F. LEADBETTER

BY
ATTORNEY

United States Patent Office 3,440,756
Patented Apr. 29, 1969

3,440,756
ANGLING LURES
Horace F. Leadbetter, 2567 St. Clair Ave. E.,
Toronto 16, Ontario, Canada
Filed Oct. 10, 1967, Ser. No. 674,258
Int. Cl. A01k 85/00
U.S. Cl. 43—42.06    6 Claims

ABSTRACT OF THE DISCLOSURE

A fish lure having a hollow and flexible tube with an opening at the forward end and a restricted opening at the rearward end, forming a passage therebetween. The tube has an axially elongated spine extending rearwardly from the forward end and inwardly from one side only of the tube. The spine has a longitudinal opening completely therethrough, for insertion of a pin. The tube is sufficiently flexible to permit distortion of its normally serpentine configuration by the pressure of water within the tube as the lure is pulled through water. The pin provides for a line connection at its forward end and a hook connection at its rearward end.

---

Figure 1:
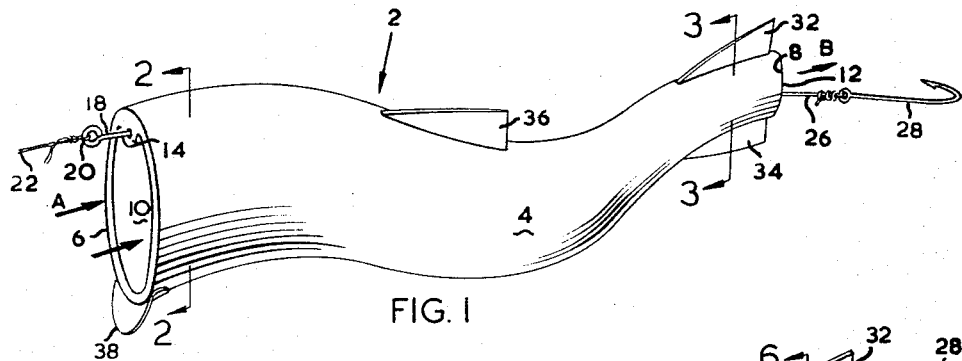

The present invention relates to angling lures and more particularly to fishing lures having a highly effective fish-attracting effect when they are pulled through a body of water.

In its broadest scope, the present invention provides a fishing lure comprising a hollow and flexible tube having a forward end and a rearward end and being provided at said forward end with an opening for the ingress of water into said tube and, at said rearward end, with an opening for the restricted egress of water from said tube, said tube normally being longitudinally distorted into a generally serpentine configuration but being sufficiently flexible that said configuration is modified by the pressure of water within said tube as the lure is pulled through a body of water.

Since the pressure of the water within the tube will depend on the relative speed of the lure with respect to the water and since this relative speed will continually vary as a result of such factors as the water current, the magnitude and direction of the force applied to the line by the fisherman and any strain applied to the lure by a victim fish, it will be appreciated that the water pressure within the tube will continually vary. As a result of this continually varying pressure, the configuration of the lure will in turn continually vary and it is this continual change of configuration which is responsible for the highly effective action of the lures of the present invention.

It will be appreciated that, in order to obtain an elevated pressure within the tube as the lure is pulled through a body of water, it is essential that the opening for the egress of water from the tube be restricted. In a particularly useful embodiment for the lures of the invention, this effect can readily be obtained by the use of a hollow and flexible tube which tapers gradually from a relatively large cross-sectional area at said forward end to a relatively smaller cross-sectional area at said rearward end.

The lures of the invention can be formed of any suitable water-resistant and flexible material and can usefully be moulded from thermo-plastic materials such as polyethylene. In order to prevent tearing of the tubes during use, a lure in accordance with the present invention is usefully provided with a reinforced portion by means of which the lure may be secured to a fishing line and by means of which a hook may be secured to said lure. Such a reinforced portion can advantageously be provided in the form of a spine extending partially along said tube rearwardly from said forward end. By providing a longitudinal opening through such a spine, a pin may be provided extending through said longitudinal opening and the fishing line may be secured to appropriate means, such as a ring, at the forward end of such a pin. A length of line attached to such a pin, rearwardly of the spine, may then be secured to a hook. In order to prevent the pin passing forwardly through and out of the opening in the spine, the pin can be diametrically enlarged rearwardly of the spine. By providing such a spine on the inner surface of the tube, the line connected to the hook may be hidden within the tube. It will be appreciated that reinforced portions such as the aforementioned spines may be formed simultaneously with the tubes by simple moulding techniques particularly when the lures are formed from thermoplastic materials.

As will be more readily understood after consideration of the preferred embodiment hereinafter described in detail, it will be appreciated that the lures of the invention can be provided with appendages and fins and otherwise modified without departing from the spirit of the invention.

Figure 4:
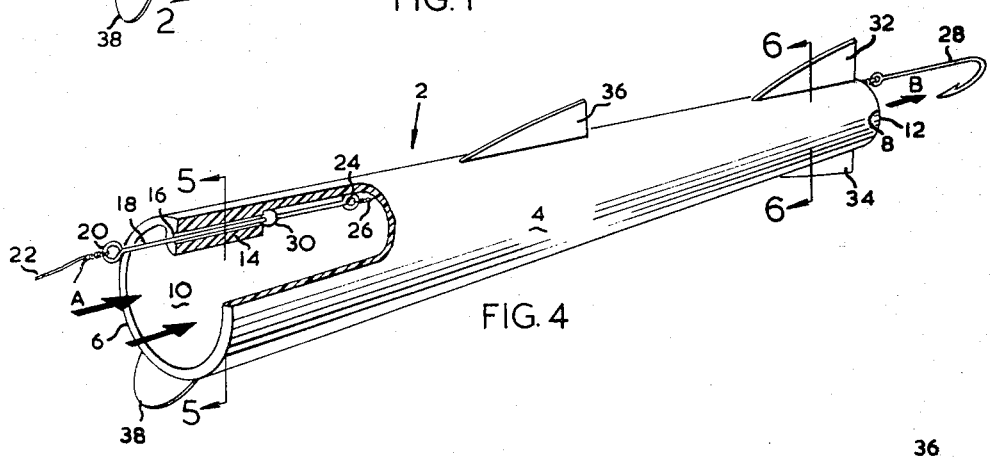
Figure 2:
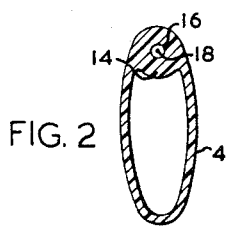
Figure 3:
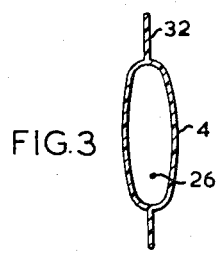
Figure 5:
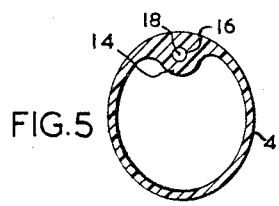
Figure 6:
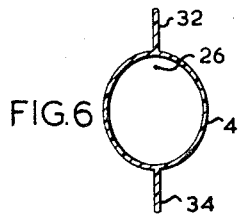
Figure 7:
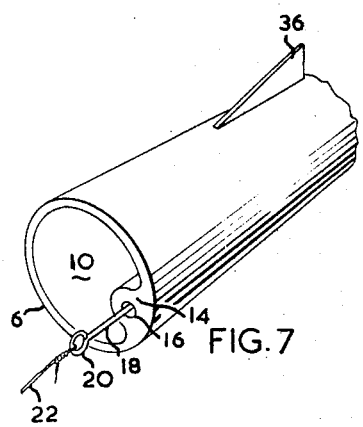

The invention will now be described merely by way of illustration with reference to the accompanying drawings in which:

FIGURE 1 is a perspective view of a fishing lure in accordance with the invention, FIGURE 2 is a vertical section along the line 2—2 of the lure of FIGURE 1, FIGURE 3 is a vertical section along the line 3—3 of the lure of FIGURE 1, FIGURE 4 is a perspective view of the lure of FIGURE 1, with parts of the wall cut away, showing the change of configuration due to the internal water pressure as the lure is pulled through a body of water, FIGURE 5 is a vertical section along the line 5—5 of the lure of FIGURE 4, FIGURE 6 is a vertical section along the line 6—6 of the lure of FIGURE 4; and FIGURE 7 is a partial perspective view of an alternative form for a fishing lure in accordance with the invention.

The fishing lure generally indicated at 2 in FIGURES 1 to 6 of the accompanying drawings comprises a hollow and flexible tube 4 having a forward end 6 and a rearward end 8. An opening 10 is provided at the forward end 6 for the ingress of water into the tube 4 as the lure is pulled through a body of water. An opening 12 is provided at the rearward end 8 of the tube 4 for the restricted egress of water from within the tube 4 as the lure is pulled through a body of water. In the embodiments shown in the drawings, the restricted egress of water from the tube is ensured by forming the tube so that it tapers from a relatively large cross-section at the forward end 6 to a relatively smaller cross-section at the rearward end 8. It will, however, be appreciated by those skilled in the art that restriction of the egress of water from the tube can be obtained in other ways.

It will be noted from FIGURE 1 that the tube normally has a longitudinally distorted generally serpentine configuration. This configuration is, as will be more fully explained hereinafter, subject to continual modification as the lure is pulled through a body of water.

The lure of FIGURES 1 to 6 is reinforced by a longitudinally extending reinforcing spine 14 which extends partially along the tube 4 rearwardly from the forward end 6 of the tube 4. This spine 14 is provided on the inner upper surface of the tube 4 and is perforated by a longitudinal opening 16. A metal pin 18 extending through the opening 16 is provided at its forward end with a ring 20 by means of which a fishing line 22 may be secured to the lure. Rearwardly of the spine 14, the metal pin 18 is provided with a ring 24 to which a length of line 26 is secured. The length of line 26 is in turn connected to a hook 28. In the embodiment shown in the drawings, the pin 18 is provided with a diametrically enlarged portion 30 which serves to prevent the pin 18 moving forwardly through the opening 16. It should particularly be noted that the length of line 26 by which the hook 28 is connected to the lure is concealed within the tube 4.

When the lure is pulled through a body of water, the water passes into the forward end 6 of the lure as indicated by the arrows A and the water pressure within the tube 4 rises as a result of the restricted opening 12 for the egress of water as indicated by the arrows B. As a result of this increase in pressure and in view of the flexible nature of the tube 4, the tube is straightened in a longitudinal direction out of the generally serpentine configuration shown in FIGURE 1 to the longitudinally straight configuration shown in FIGURE 4. In addition, the transverse sectional shape of the tube 4 becomes more circular as will be seen by comparison of FIGURES 2, 3, 5 and 6. It will be appreciated that the extent of this change of shape of the tube will depend on the speed with which the lure is drawn through the water and, since this speed will vary continually, the lure will have a continually varying configuration or shape. It is this continual change of shape which is responsible for the highly effective fish-attracting behaviour of the lure.

If desired, various appendages may be attached to the tube 4 and the embodiment shown in FIGURES 1 to 6 is shown as being provided with upper and lower tail fins 32 and 34 respectively and with a dorsal fin 36. At the forward end 6, a forwardly and downwardly projecting ventral scoop 38 is also provided. If desired, other appendages and/or markings may be provided to make the lure even more attractive to fish.

As hereinbefore indicated, the tube may be reinforced in any convenient manner and, if a reinforcing spine is used for this purpose, it may be provided at the side of the tube as shown in FIGURE 7 or in any other suitable position.

If desired, additional openings for the egress of water from the tube may be provided in the walls of the tube but it will be appreciated that the number and size of such additional openings will be restricted so as to ensure that the desired pressure increase is obtained within the tube as the lure is pulled through a body of water. Similarly, additional openings for the ingress of water may be provided at or near the forward end of the lure. It will also be appreciated that the normal serpentine configuration can be provided in a plane other than the vertical one.

Minor changes in shape, size, and rearrangement of details coming within the field of the invention may be resorted to in actual practice, if desired.

The embodiments of the invention in which an exclusive privilege or property is claimed are defined as follows:

1. A fishing lure comprising a hollow and flexible tube having a forward end and a rearward end and being provided at said forward end with an opening for the ingress of water into said tube and, at said rearward end, with an opening for the restricted egress of water from said tube, said tube normally being longitudinally distorted into a generally serpentine configuration but being sufficiently flexible that said configuration is modified by the pressure of water within said tube as the lure is pulled through a body of water, said tube being provided with a reinforced portion by means of which said lure may be secured to a fishing line and by means of which a hook may be secured to said lure, and in which said reinforced portion is in the form of an axially elongated spine extending inwardly from one side only of the tube and partially along said tube rearwardly from said forward end and in which a longitudinal opening is provided completely through said spine for the purposes of securing said lure to a fishing line and of securing a hook to said lure.

2. A fishing lure as claimed in claim 1 in which a pin extends through said longitudinal opening in said spine, in which said pin is provided at its forward end with means by which it may be secured to a fishing line and in which said pin, rearwardly of said spine, is secured to a length of line to which a hook may be secured.

3. A fishing lure as claimed in claim 2 in which, rearwardly of said spine, said pin is diametrically enlarged to prevent said pin passing forwardly through and out of said opening in said spine.

4. A fishing lure as claimed in claim 1 in which said hollow and flexible tube tapers gradually from a relatively large cross-sectional area at said forward end to a relatively smaller cross-sectional area at said rearward end.

5. A fishing lure as claimed in claim 1 in which one or more radially projecting fins are provided on the outer surface of said tube and in which a downwardly and forwardly projecting scoop is provided at the lower edge of said forward end of said tube.

6. A fishing lure as claimed in claim 2 in which said length of line is disposed within said tube.

References Cited

UNITED STATES PATENTS

| | | | |
|---|---|---|---|
| 2,027,069 | 1/1936 | Sorenson | 43—42.06 |
| 2,176,803 | 10/1939 | Rosselle | 43—42.06 |
| 2,183,816 | 12/1939 | Lovelace | 43—42.06 X |
| 2,261,549 | 11/1941 | Hayes | 43—42.06 |
| 2,560,733 | 7/1951 | Morris | 43—42.06 |
| 2,690,026 | 9/1954 | King | 43—42.36 X |
| 2,792,662 | 5/1957 | Norton | 43—42.36 X |

SAMUEL KOREN, *Primary Examiner.*

JAMES H. CZERWONKY, *Assistant Examiner.*

U.S. Cl. X.R.

43—42.26, 42.36